United States Patent Office 2,808,371
Patented Oct. 1, 1957

2,808,371
CARBONATE PURIFICATION

Henry C. Stevens, Akron, Ohio, assignor to Columbia-Southern Chemical Corporation, Allegheny County, Pa., a corporation of Delaware No Drawing. Application April 29, 1954,
Serial No. 426,580

15 Claims. (Cl. 202—57)

This invention relates to a method of preparing carbonate esters and it more particularly pertains to a novel method of providing purified carbonate esters.

Carbonate esters, e. g. diesters of carbonic acid, are prepared by reaction of haloformate and an alcohol. In the process such as described in U. S. Letters Patent 1,638,014, the haloformate is normally provided by reaction of phosgene with an alcohol and the resulting chloroformate is further reacted with another mole equivalent of alcohol, thereby providing the carbonate ester.

In processes of this character as well as others, the resulting carbonate ester often contains a significant and contaminating quantity of combined hydrolyzable halogen, notably combined hydrolyzable chlorine. The exact manner in which the halogen is combined is not completely understood but it appears to be present as residual haloformate or halogen which is directly attached to a carbonyl group. Removal of this chlorine from the carbonate ester by recourse to physical treatments such as distillation is quite difficult and efficient removal is not usually possible.

According to the present invention, a novel method for preparing high purity carbonate esters is provided which is capable of being conducted in a rapid and efficient manner. It has been found that hydrolyzable halogen may be removed from carbonate esters containing a contaminating quantity of such hydrolyzable halogen by contacting the contaminated carbonate ester with a tertiary amine. Application of heat to amine-containing medium expedites the desired effect. Subsequently, the carbonate ester may be recovered or separated by fractional distillation or simple topping from the treated medium, and this product contains a reduced quantity and normally an inconsequential quantity of hydrolyzable halogen. Essentially quantitative preparation of carbonate esters containing less than 0.001 percent hydrolyzable chlorine may be obtained by practice of this invention. The terms "chloroformate chlorine" or "haloformate halogen" or "hydrolyzable chlorine" as used herein mean chlorine or halogen which is determined by the method of analysis set forth below and which halogen is apparently linked directly to a carbonyl group. For example, the chlorine present in the chloroformate

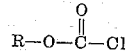

is considered to be chloroformate chlorine within the meaning of the term as herein used.

Determination of the chloroformate chlorine present in the carbonate ester involves the formation of a pyridinium salt whose chlorine is ionically bound and therefore is available for titration as chloride ion. Fifty grams of the carbonate ester are placed in a 250 milliliter beaker and 10 milliliters of an aqueous pyridine solution containing 20% pyridine by weight are added. The mixture is vigorously stirred and then allowed to stand for 5 minutes with intermittent stirring. Then, 50 milliliters of distilled water are added and 5 milliliters of 10% ferric nitrate solution. (The 10% ferric nitrate solution is prepared by dissolving 100 grams of chemically pure catalyst normally Fe (NO$_3$)$_3$ in 600 milliliters of distilled water, adding 25 milliliters of chemically pure concentrated HNO$_3$ (70 percent HNO$_3$ by weight) and diluting the final solution to 1 liter with distilled water.) The mixture is acidified with concentrated nitric acid (70% HNO$_3$ by weight) and cooled to room temperature.

This solution is then titrated with 0.1 N standard silver nitrate until no more silver chloride is precipitated. An excess (2 milliliters or more) of 0.1 N standard silver nitrate is added and the solution is stirred vigorously until the silver chloride coagulates. Excess silver nitrate is then titrated with 0.1 N standard potassium thiocyanate until a faint rust-red color persists. The calculations are made thus:

$$\text{Percent Cl} = \frac{(\text{milliliters AgNO}_3 \times N_1) - (\text{milliliters KCNS} \times N_2) \times 0.03545}{50} \times 100$$

where $N_1$=normality of the silver nitrate and $N_2$=normality of the potassium thiocyanate.

In conducting the process of this invention, carbonate esters containing undesirable quantities of combined hydrolyzable chlorine or haloformate halogen (hereinafter referred to as haloformate or chloroformate) are treated with appropriate quantities of a tertiary amine, e. g. triethanol amine. Usually, after mixing the amine with the carbonate ester it is desirable to apply heat. It will be appreciated that the exact temperature to which the medium is heated and the length of time at which the heating is maintained are capable of wide variation without departing from the scope of this invention. Various factors usually impose practical limitations upon the temperature and length of heating. Thus, the temperature of the medium is maintained at no higher than the boiling temperature of the carbonate ester, unless recourse to superatmospheric conditions is had. Prolonged heating is usually unnecessary with periods on the order of up to 1 or 2 hours being adequate unless unusually high concentrations of haloformate are encountered in which case somewhat lengthier periods are suggested.

The chloroformate or haloformate contaminant present with the desired carbonate ester may be present as a result of the manner in which the carbonate ester is prepared or for any other cogent reason. The specific derivation of the chloroformate has no bearing upon the operability of the present invention, although particularly advantageous and cooperative processes are provided by combining the present purification treatment with processes for the preparation of the carbonate ester.

In one such contemplated process, phosgene and an alcohol such as ethanol are reacted in equimolecular proportions whereby to provide ethyl chloroformate which product is in turn reacted with another mole equivalent of ethyl alcohol whereby to provide diethyl carbonate. It has been found as a result of such procedure the diethyl carbonate contains a minor but significant contaminating quantity of ethyl chloroformate even after fractional distillation. The exact quantity of chloroformate will vary depending on the efficiency with which the reaction is conducted (such as the temperatures and other conditions) but even in those instances where reaction of the ethyl chloroformate with ethyl alcohol is conducted in large excesses of the alcohol, a sizeable and undesirable concentration of choloroformate is encountered. It is not unusual to have chloroformate chlorine contents of from 1 to 5 percent by weight in the carbonate ester even when large excesses of the alcohol are utilized in the carbonate formation step.

Thus, carbonate esters containing between about 1 to 5 percent by weight of choloroformate chlorine are those which may be encountered in the practice of this invention although even higher concentrations of chloroformate chlorine may be treated. For economical reasons such as when the amine is costly, the chloroformate chlorine concentration of the carbonate ester material may be reduced by treatment with sodium hydroxide or other alkaline metal or alkaline earth metal hydroxide, carbonate or bicarbonate whereby to partially reduce the chloroformate content usually to about 1 to 2 percent or in rare occasions somewhat below 1 percent. Then, in accordance with this invention, a tertiary amine is employed to reduce the chloroformate chlorine concentration below about 0.1 percent and preferably below about 0.001 percent by weight.

In lieu of the above described partial chloroformate chlorine removal technique wherein sodium hydroxide or the like is employed, partial removal of the chloroformate chlorine can be accomplished by fractional distillation to reduce the chloroformate chlorine concentration to below about 1 percent, normally to from about 0.2 to 0.5 percent by weight when the carbonate is diethyl carbonate. With other carbonate esters, it will of course be appreciated that the efficiency of this distillation will vary, but reduction of the chloroformate chlorine concentration substantially below about 0.2 percent by weight is a rarity. Still other expedients for removing or partially removing chloroformate chlorine from carbonate esters may be employed as an intermediate step prior to the amine treatment.

In conducting this invention, the amine is simply mixed with the carbonate ester and after permitting a suitable time period to elapse the carbonate esters are separated, notably by simple distillation or by fractional distillation when the esters are of suitable volatility. By heating the amine-containing carbonate ester medium the treatment may be accelerated.

Sufficient amine is added to remove the desired quantity of chloroformate chlorine. In this regard it has been discovered that a mole ratio of amine to chloroformate chlorine which is in excess of unity affords optimum chloroformate chlorine removal. Thus, according to a preferred embodiment of this invention, at least about two moles of tertiary amine per mole of chloroformate chlorine to be removed is employed. Of course, even larger mole equivalent ratios of tertiary amine to chloroformate chlorine may be used. Likewise, but not with equivalent efficiency, removal of chloroformate chlorine may be achieved by using less than two moles of tertiary amine per mole equivalent of chloroformate chlorine. In this regard, mole equivalent ratios of about 1 are about 70 to 80 percent efficient.

After adding the amine to the carbonate ester containing a contaminating quantity of chloroformate chlorine, heating within the scope of this invention may be effected by recourse to usual heat transfer techniques such as by steam jacketing the medium. An especially preferred technique includes refluxing the carbonate ester medium to which the amine has been added. The temperatures of this refluxing operation are usually at or about the normal boiling point of the carbonate ester. After refluxing, the refluxing apparatus such as is provided by a condenser may be replaced by a distillation head having adequate plates and the carbonate product may be distilled and separated from the residue that results. Usually bath temperatures somewhat in excess of the normal boiling point of the carbonate ester are employed but the head temperature in the distillation column is maintained at the normal boiling point of the carbonate ester. If either superatmospheric or subatmospheric pressures are utilized in connection with these procedures, corresponding changes in the various temperatures may be necessary and will be apparent to one skilled in the art.

Various tertiary amines are suitable and included are trimethylamine, triethylamine, tri-n-propylamine, tributylamine, and the corresponding higher trialkylamines. Other contemplated aliphatic tertiary amines include triethanolamine, triisopropanolamine, tributanolamine and other similar trialkyl amines. Preferred trialiphatic tertiary amines are those which are liquid at the refluxing temperatures employed in the purification step and which are preferably high boiling, e. g. that is, preferably boiling above the temperature at which the carbonate ester boils. Recovery of essentially water insoluble tertiary amines, e. g. the trialiphatic amines, may be effected by treating the residue from which the carbonate has been removed with alkalis such as sodium hydroxide, potassium hydroxide, etc. The resulting organic phase of amine may then be phase separated.

Carbonates which may be treated in accordance with the principles of the present invention may be considered as diesters of carbonic acid conforming to the general structure:

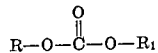

wherein R and $R_1$ are radicals of alcohols and hydroxy compounds $R(OH)x$ containing a hydroxyl group which is esterifiable by acids. X preferably represents 1, but may be any small whole integer, usually from 1 to 3.

A preferred class of carbonic acid diesters treated in accordance with this invention are the dialkyl esters of carbonic acid such as dimethyl carbonate, diethyl carbonate, diisopropyl carbonate, dipropyl carbonate and similar dialkyl carbonates derived from alcohols containing preferably up to 5 carbon atoms. Mixed dialkyl carbonates also provide another preferred group and include by way of illustration methyl-ethyl carbonate, ethyl-isopropyl carbonate, etc. These dialkyl carbonates are usually prepared by reaction of a monohydric alcohol such as methanol with phosgene whereby to produce the corresponding alkyl chloroformate. In turn, an additional mole equivalent of the same alcohol or in the case of mixed dialkyl carbonates a different alcohol is reacted with the chloroformate.

Besides the chloroformates or haloformates of the monohydric aliphatic alcohols which are employed in preparation of carbonates such as contemplated in the above paragraph, other monochloroformates may be used such as those derived from phenol, substituted phenols, and the like. Also, polyhaloformates of various polyhydroxy compounds notably dihydroxy and trihydroxy compounds are likewise suitable. Some such polyhydroxy compounds include the glycols and polyglycols such as alkylene glycols among which are ethylene glycol, diethylene glycol, triethylene glycol, trimethylene glycol, pentamethylene glycol, tetramethylene glycol, propylene glycol, etc., and other polyhydroxy ethers, polyglycols such as di-, tri-, and tetra-, alkylene glycols. Aromatic dihydroxy compounds such as resorcinol, phthalyl alcohol, etc. can be employed to provide polyhaloformates.

Such haloformates and notably the chloroformates of these hydroxy compounds may be further reacted with various monohydric or polyhydric saturated or unsaturated alcohols including methyl, ethyl, propyl, isopropyl, butyl, or isobutyl alcohol, or other aliphatic alcohols including stearyl, dodecyl, cetyl, and melissyl alcohols, or the aromatic alcohols such as benzyl, phenylethyl, etc. Unsaturated alcohols such as allyl, methallyl, crotyl, isocrotyl, cinnamyl, propargyl, tiglyl, or methyl vinyl carbinyl alcohols, citronellol, geraniol, and the higher molecular alcohols including oleyl and linoleyl alcohols, also substituted alcohols such as 2-chloroallyl, 2-bromoallyl, or chlorocrotyl alcohol, 3-chlorobutene 2-ol-1, or other halogen substituted alcohols may also be reacted with the chloroformates to provide carbonate esters.

Likewise polyhydric alcohols such as those used and described in the preparation of polyhaloformates may be reacted with the aforedescribed haloformate and the residual chloroformate chlorine may be removed in accordance with this invention. Besides the aforenumerated hydroxy compounds, the chloroformates may be reacted with hydroxy acids such as lactic, glycollic, tartaric, citric, hydroxy butyric, salicylic, vicinoleic acids or the esters of such acids.

Carbonates which are normally liquid at temperatures below about 200° C. are most easily subjected to this purification treatment. However, even carbonates containing higher melting points may be treated. Usually, the treatment is effected in the presence of liquified carbonate. For example, the carbonate may be heated to liquid state and the tertiary amine added.

The following example illustrates the manner in which the present invention may be practiced:

EXAMPLE I

To 50 grams of diethyl carbonate containing chloroformate chlorine in the amount designated in Table I below, was added triethanolamine in the amounts listed in Table I. This mixture was refluxed in a suitable glass flask for one hour under a water-cool condenser. At the conclusion of this hour the condenser was replaced by a 1-plate distillation head and the diethyl carbonate distilled. A bath temperature of 140° C. was employed while the head temperature reached about 124–125° C. The overhead product was water-white and had a refractive index of $n^{20}D$ 1.3848. Residues in the respective runs were white solids which were water soluble, insoluble inorganic solvents and gave a strong chloride test in water solution.

A series of runs were conducted following the above outlined procedure and the specific conditions and results are listed in Table I.

Table I

| Run | Chloroformate Chlorine (Percent by weight) | Triethanolamine—Weight (Grams) | Mole Ratio Amine to Chloroformate Chlorine | Product |  |  |
|---|---|---|---|---|---|---|
|  |  |  |  | Weight Grams | Chloroformate Chlorine | Percent Removed |
| 1 | 0.25 | 0.5598 | 1.06 | 47.9 | 0.07 | 72.0 |
| 2 | 0.22 | 0.982 | 2.19 | 48.1 | 0.001 | 99.5 |
| 3 | 0.22 | 1.5377 | 3.32 | 48.4 | 0.001 | 99.5 |

EXAMPLE II

To 20 milliliters (21.4 grams) of dimethyl carbonate containing 0.18 percent chloroformate chlorine by weight was added one percent tri-n-butylamine by weight of the dimethyl carbonate. This amine-containing medium was then refluxed for one hour whereafter the dimethyl carbonate was distilled. The product had a refractive index of $n^{20}D$ 1.3688 and contained less than 0.005 percent chloroformate chlorine by weight. Substantially complete recovery of the dimethyl carbonate was achieved.

Although the present invention has been described with reference to specific details of certain embodiments, it is not intended that such details shall be regarded as limitations upon the scope of the invention except insofar as they are included in the appended claims.

I claim:

1. The process of treating a carbonate ester contaminated with a haloformate halogen which comprises contacting the contaminated carbonate ester with a tertiary amine and thereafter recovering the carbonate ester.

2. In the process of preparing a carbonate ester by reaction of a haloformate with an alcohol whereby a carbonate ester containing haloformate halogen as an impurity is obtained, the step of contacting a tertiary amine with the haloformate halogen-containing carbonate ester and thereafter recovering the carbonate ester.

3. The method of purifying a carbonate ester contaminated with haloformate halogen which comprises adding a tertiary amine to the contaminated carbonate ester, refluxing said tertiary amine-containing carbonate ester medium and thereafter distilling the medium whereby to obtain a carbonate ester.

4. The method of purifying a dialiphatic ester of carbonic acid containing haloformate halogen as an impurity incident to the preparation of the ester which comprises adding a tertiary amine to the contaminated carbonate diester and thereafter separating the ester by distillation.

5. The method of purifying a dialiphatic ester of carbonic acid which contains haloformate halogen as an impurity incident to the preparation of the carbonate in concentrations of at least about 0.2 percent haloformate halogen by weight of the ester which comprises adding triethanol amine to the contaminated diester, heating said carbonate diester whereby to distill off the product.

6. A method of purifying a dialiphatic ester of carbonic acid contaminated with haloformate halogen as an incident to the preparation thereof which comprises heating said contaminated carbonate diester in the presence of a tertiary amine and recovering the purified diester.

7. The method of claim 6 wherein the dialiphatic carbonate ester is a dialkyl ester of carbonic acid.

8. The method of claim 6 wherein the haloformate halogen is present as an impurity in the ester concentrations of at least about 0.2 percent by weight of the ester.

9. The method of purifying a dialkyl ester of carbonic acid which is contaminated with haloformate halogen as an incident to the preparation thereof which comprises heating said contaminated diester in the presence of a tertiary amine whereby to reflux the ester and thereafter recovering the purified diester.

10. The method of purifying a dialkyl ester of carbonic acid contaminated with haloformate halogen as an incident to the preparation of the diester which comprises heating said diester in the presence of at least about one mole of a tertiary amine per mole of haloformate halogen present in the carbonic acid ester as an impurity and subsequently recovering the carbonate ester.

11. The method of purifying diethyl carbonate contaminated with chloroformate chlorine present as an incident to the preparation of the diethyl carbonate which comprises heating said diethyl carbonate in the presence of triethanolamine and thereafter distilling the diethyl carbonate from the resulting medium.

12. A method of purifying diethyl carbonate containing a contaminating concentration of haloformate halogen as an incident to the preparation of the diethyl carbonate wherein the haloformate halogen is present in concentrations of at least about 0.2 percent by weight of the ester, which comprises heating the ester in the presence of at least about 1 mole equivalent of triethanol amine per mole equivalent of haloformate chlorine present as a contaminant in the ester.

13. The method of purifying diethyl carbonate contaminated with chloroformate chlorine which comprises contacting the contaminated diethyl carbonate with a tertiary amine and thereafter recovering the carbonate ester.

14. The method of purifying dimethyl carbonate contaminated with chloroformate chlorine which comprises contacting the contaminated dimethyl carbonate with a tertiary amine and thereafter recovering the carbonate ester.

15. The method of purifying a dialiphatic ester of carbonic acid derived from an alcohol containing up to 5 carbon atoms which comprises adding a tertiary amine to the contaminated carbonate ester and thereafter recovering the carbonate ester.

References Cited in the file of this patent

UNITED STATES PATENTS

| | | |
|---|---|---|
| 1,638,014 | Mitchell | Aug. 9, 1927 |
| 2,114,866 | Vaughn | Apr. 19, 1938 |
| 2,357,412 | Levesque | Sept. 5, 1944 |
| 2,517,965 | Bohl | Aug. 8, 1950 |
| 2,640,846 | Hurwitz et al. | June 2, 1953 |